(12) United States Patent
Kim et al.

(10) Patent No.: US 7,558,977 B2
(45) Date of Patent: Jul. 7, 2009

(54) DEVICE AND METHOD FOR POWER MANAGEMENT IN A DISPLAY DEVICE

(75) Inventors: Dae Hyun Kim, Busan (KR); Tae Hwa Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 441 days.

(21) Appl. No.: 11/450,301

(22) Filed: Jun. 12, 2006

(65) Prior Publication Data
US 2006/0282693 A1      Dec. 14, 2006

(30) Foreign Application Priority Data
Jun. 13, 2005 (KR) ............... 10-2005-0050178
Aug. 12, 2005 (KR) ............... 10-2005-0074149

(51) Int. Cl.
*G06F 1/32* (2006.01)
(52) U.S. Cl. ............... 713/320; 713/300; 348/14.04
(58) Field of Classification Search .............. 713/320, 713/300
See application file for complete search history.

(56) References Cited

U.S. PATENT DOCUMENTS 5,036,261 A * 7/1991 Testin ............... 315/411
5,477,279 A * 12/1995 Chang ............... 348/730
5,634,798 A * 6/1997 Suh ............... 434/307 A
5,900,913 A * 5/1999 Tults ............... 348/468
6,285,406 B1* 9/2001 Brusky ............... 348/552
6,900,849 B1* 5/2005 Friedreich ............... 348/730
6,985,191 B2* 1/2006 Choi ............... 348/730

FOREIGN PATENT DOCUMENTS

KR      1998-020617         8/1998
WO    WO 2004/091212     10/2004

OTHER PUBLICATIONS

Korean Office Action dated Oct. 30, 2006.

* cited by examiner

*Primary Examiner*—Nitin C Patel
(74) *Attorney, Agent, or Firm*—Ked & Associates, LLP

(57) ABSTRACT

A display device for managing power supply in an active stand-by mode is disclosed. More specifically, the display device includes a signal mode supply unit which provides control signals for a mode in which a digital cable ready (DCR) feature is selected or for a mode in which a digital video recorder (DVR) feature and a signal processing circuit are selected. Furthermore, the device includes a stand-by power supply unit for supplying power for operating a micro computer and for operating at least one DCR feature if the DCR feature is selected, and a multi-power supply unit for supplying power for operating at least one DVR feature and for operating a signal processing circuit if the DVR feature is selected.

23 Claims, 9 Drawing Sheets

DEVICE AND METHOD FOR POWER MANAGEMENT IN A DISPLAY DEVICE

This application claims the benefit of Korean Application No. P10-2005-0050178, filed on Jun. 13, 2005, and of Korean Application No. P10-2005-0074149, filed on Aug. 12, 2005, which are hereby incorporated by reference.

BACKGROUND OF THE INVENTION

1. Field of the Invention

The present invention relates to a device and method of managing power, and more particularly, to a device and method for power management in a display device.

2. Discussion of the Related Art

In a conventional display device having a digital cable ready (DCR) function, there are two modes associated power management, namely, stand-by mode and normal mode. In stand-by mode, a minimum amount of power (e.g., amount of power just enough to receive signals from a remote control device) is supplied to the display device. In normal mode, a sufficient amount of power is supplied to the display device enabling a user to normally operate and control the display device.

FIG. 1 is a block diagram illustrating an operation of power management units of a display device in stand-by mode. In FIG. 1 where the display device 1 is in stand-by mode, an alternating current (AC) is supplied to the AC power input unit 2. However, because a switch (SW1) is turned off or open, the AC power follows the path where power is supplied only to a first rectifying unit 3 which is connected to a micro computer power supply unit 4. In the second rectifying unit 5, the AC power supplied to the first rectifying unit 3 is converted AC power to a direct current (DC) power, which is then supplied to the power supply unit 4.

FIG. 2 is a block diagram illustrating an operation of power management units of a display device in normal mode. In FIG. 2 where the display device 1 is in normal mode, the AC power is supplied to the AC power input unit 8. Here, because the switch (SW2) is turned on or closed, the AC power is supplied not only to the first rectifying unit 9 but also to the second rectifying unit 11. The second rectifying unit 11 is connected with a power supply unit for signal processing 13 and a power supply unit for display 14. In addition, the first rectifying unit 9 converts the AC power to the DC power, and then transmits the converted DC current to the micro computer power supply unit 10. Furthermore, the second rectifying unit 11 converts the AC power to the DC power, and then transmits the converted DC current to a power factor correction (PFC) unit 12. The PFC unit 12 thereafter supplies to all the power supply units including the DC power to the power supply unit for signal processing 13 and the power supply unit for display 14. Here, the PFC unit 12 refers to a type of a power-saving circuit added to the power management device in order to improve power efficiency.

The power supply units of the display device have the following problems. First, according to the power management units of the conventional display device only have two modes, namely, stand-by mode and normal mode, a user cannot turn on or operate the display module unless in normal mode. In addition, the problem of normal mode is that power is supplied to the display module unnecessarily even if the user does not wish to view the display or to have power provided to the display module.

In addition, even when only minimum amount of power is supplied to the power management units, power is passed through the PFC unit, resulting in inefficient power management.

SUMMARY OF THE INVENTION

Accordingly, the present invention is directed to a device and method for power management in a display device that substantially obviates one or more problems due to limitations and disadvantages of the related art.

An object of the present invention is to provide a display device for managing power supply in an active stand-by mode.

Another object of the present invention is to provide a method of managing power in a display device in active stand-by mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device for managing power supply in an active stand-by mode includes a signal mode supply unit which provides control signals for a mode in which a digital cable ready (DCR) feature is selected or for a mode in which a digital video recorder (DVR) feature and a signal processing circuit are selected. Furthermore, the device includes a stand-by power supply unit for supplying power for operating a micro computer and for operating at least one DCR feature if the DCR feature is selected, and a multi-power supply unit for supplying power for operating at least one DVR feature and for operating a signal processing circuit if the DVR feature is selected.

In another aspect of the present invention, a method of managing power in a display device in active stand-by mode includes determining whether a digital cable ready (DCR) feature is selected and supplying power to a power supply unit for operating a micro computer and for operating at least one DCR feature if the DCR feature is selected.

In further aspect of the present invention, a method of managing power in a display device in active stand-by mode includes determining whether a digital personal recorder (DVR) feature is selected and supplying power to a first power supply unit for operating the micro computer, and a second power supply unit for operating at least one DVR feature and for operating a signal processing circuit if the DVR feature is selected.

Yet, in another aspect of the present invention, a display device for managing power supply in an active stand-by mode includes an alternating current (AC) input unit for receiving the AC power, a rectifying unit for converting the AC power to a direct current (DC) power, and a switch unit for directing power to be supplied to a signal processor power supply unit and a micro computer power supply unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Provided below is an embodiment of the present invention. Compared to the conventional display device which was limited to having only two modes, the embodiment of the present invention includes an active stand-by mode in addition to stand-by mode and normal mode.

Here, the newly introduced active stand-by mode is a mode between stand-by mode and normal mode. More specifically, in stand-by mode, a minimum amount of power (for supplying power to the micro computer) is provided, and in normal mode, power is supplied to all power supply units. In active stand-by mode, power is supplied to the micro computer and another power supply unit, but not to all power supply units, as is the case in normal mode.

Active stand-by mode can be selected in a display device having a digital cable ready (DCR) feature. In this case, preferably, power is supplied to the power supply unit of the signal processing unit and the micro computer power supply unit, but not to the power supply unit of the display unit.

Figure 1:
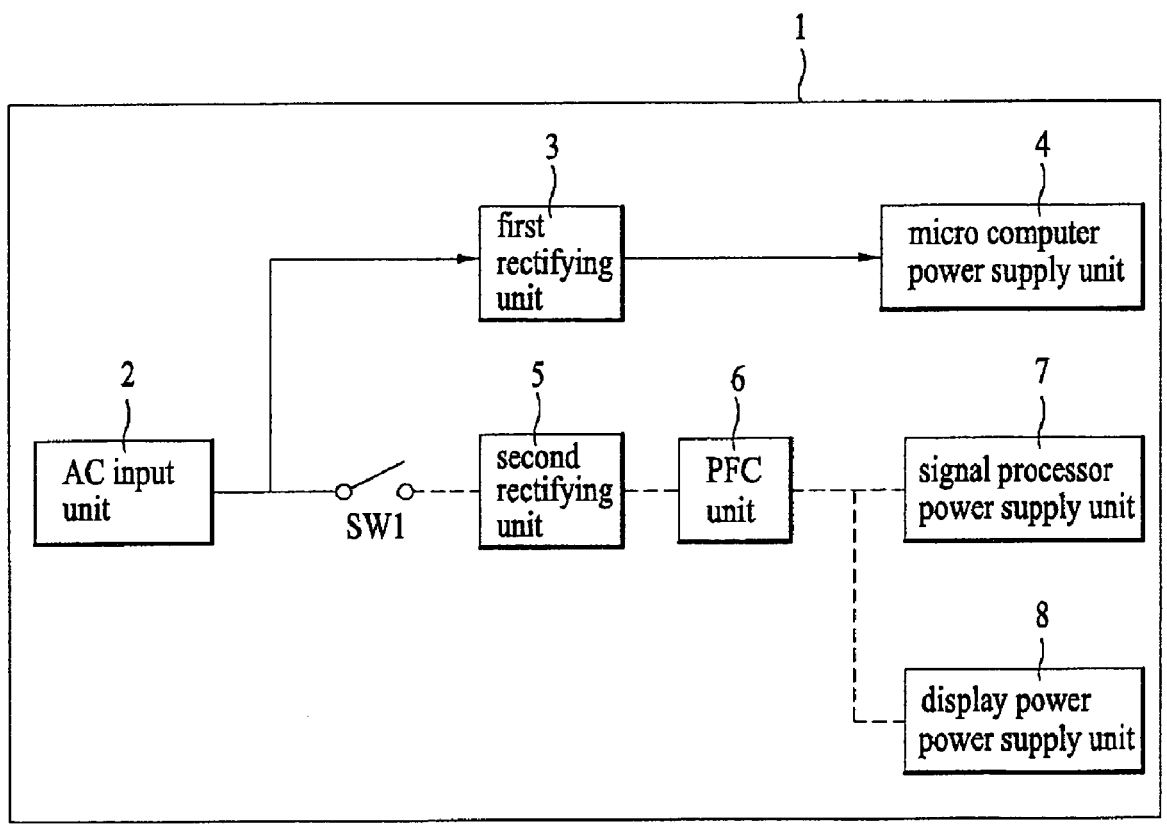
FIG. 1 is a block diagram illustrating an operation of power management units of a display device in stand-by mode.
Figure 2:
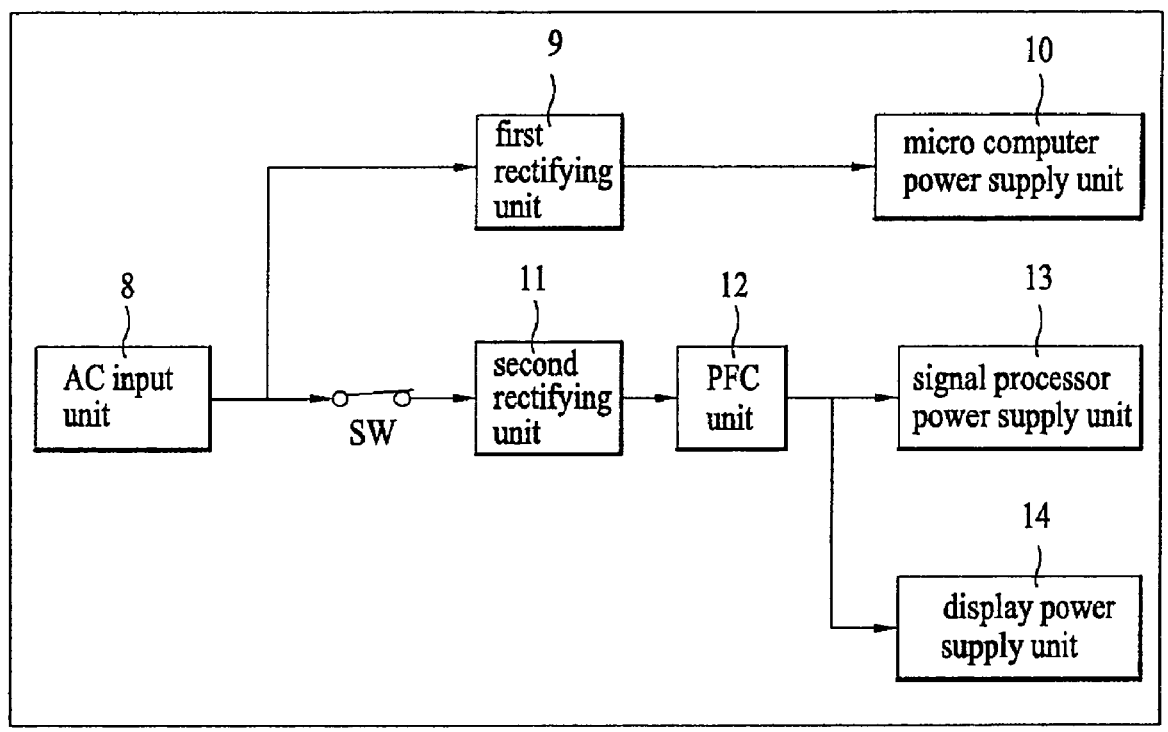
FIG. 2 is a block diagram illustrating an operation of power management units of a display device in normal mode.
Figure 3A:
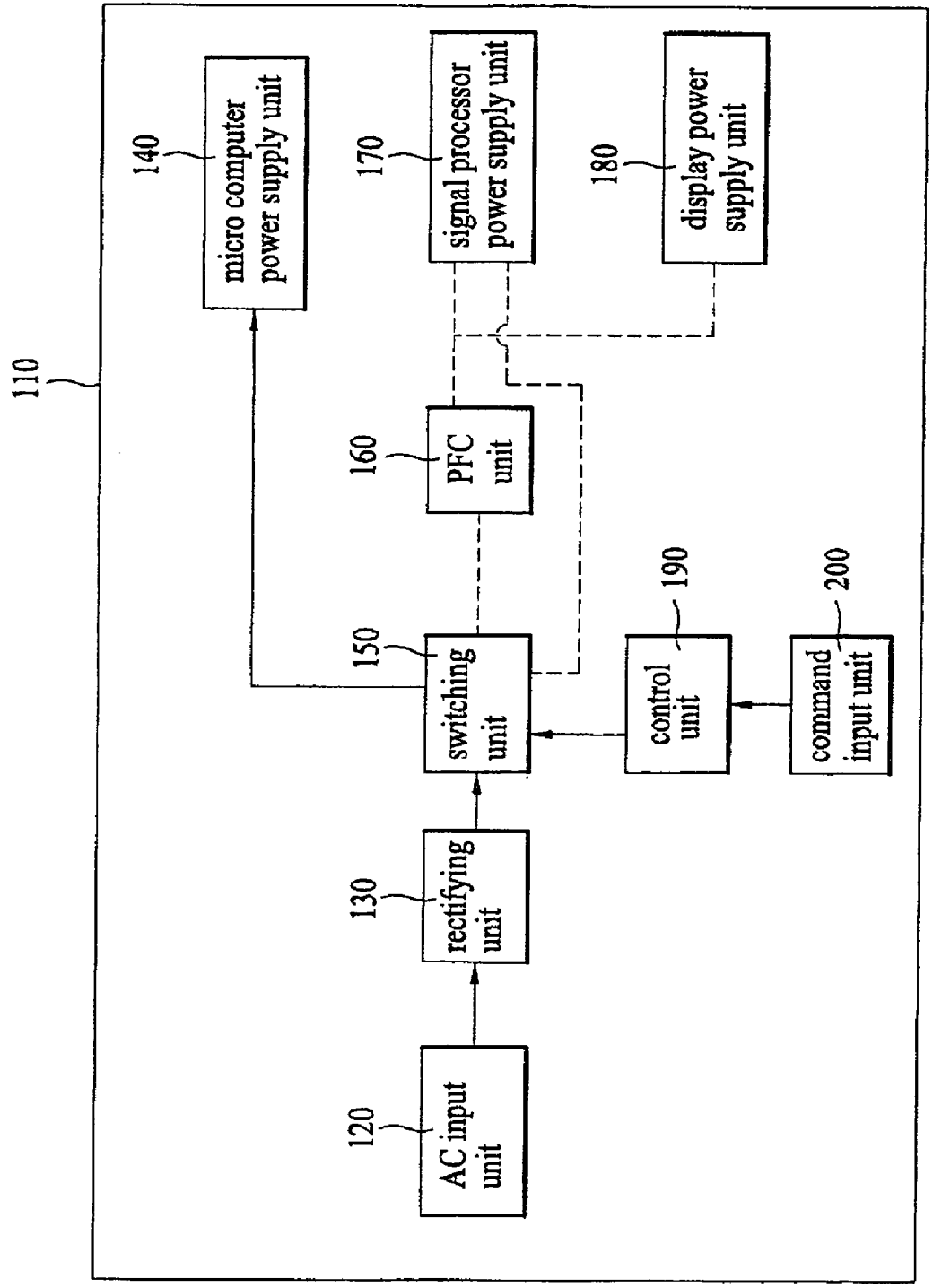
FIGS. 3a-3c are block diagrams illustrating operation of stand-by mode, active stand-by mode, and normal mode, respectively.
Figure 3B:
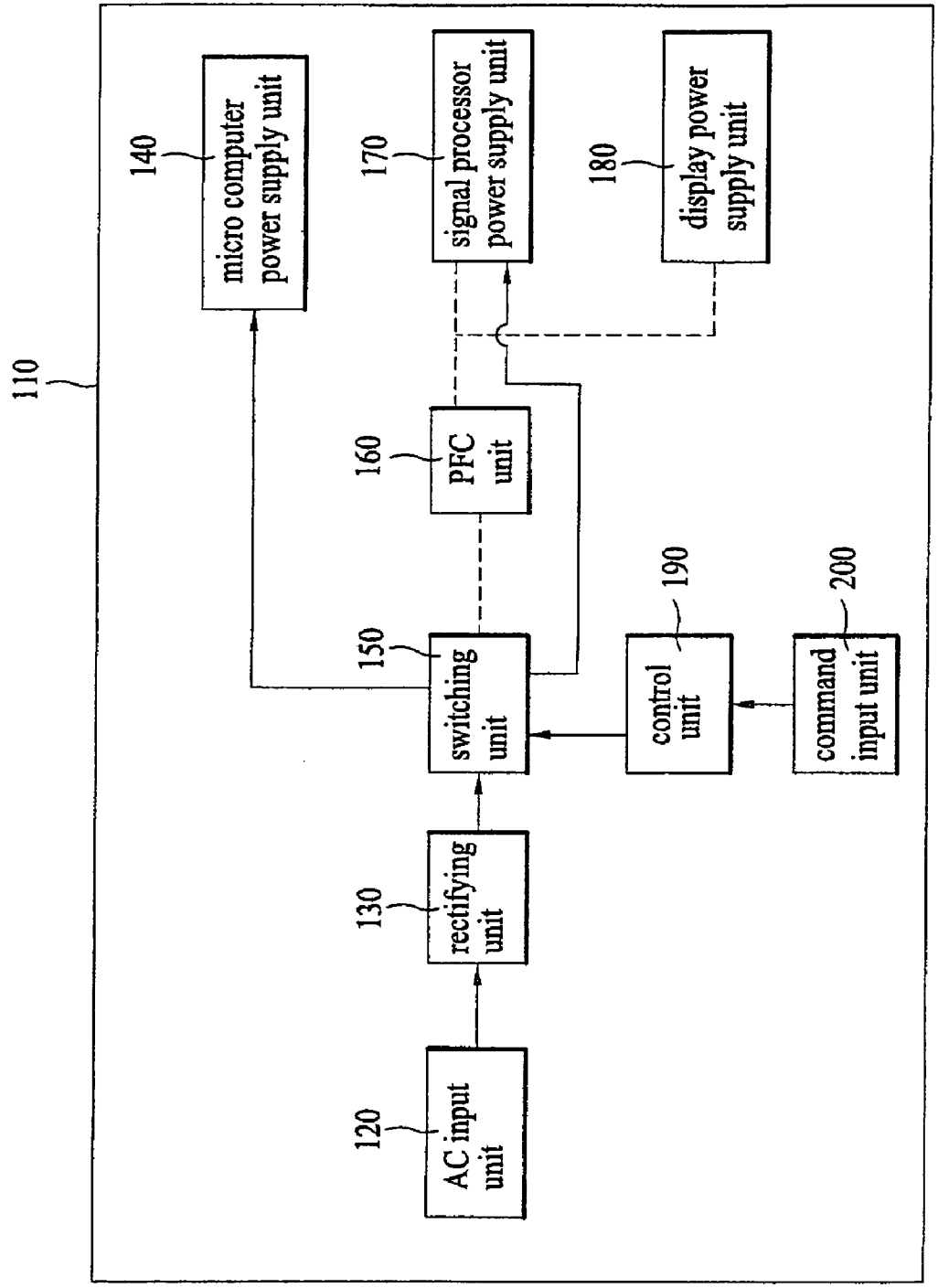
Figure 3C:
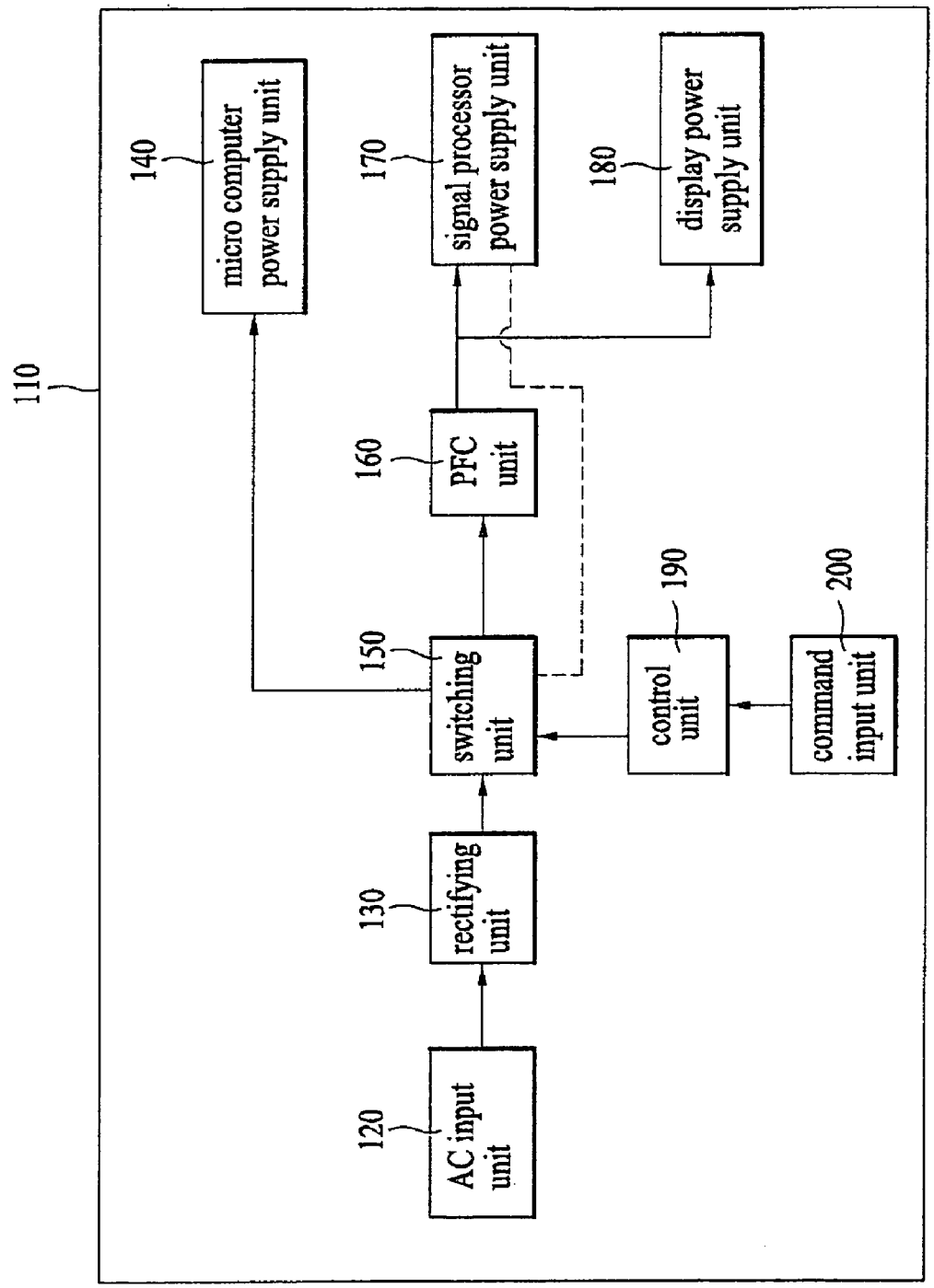

FIGS. 3a-3c are block diagrams illustrating operation of stand-by mode, active stand-by mode, and normal mode, respectively. In these figures, an AC power is inputted from an outside source to the AC input unit 120. The rectifying unit 130 converts AC power into DC power. Thereafter, the DC power, based on the status (i.e., on or off) of the switch(es) in the switching unit 150, is supplied to a specific power supply unit. At the same time, the command input unit 200 receives a selection from a user with respect to the type of power management mode for the display device. The control unit 190 controls the switching unit 150 according to the power management mode selected by the user. Here, the switching unit 150 routes power from the rectifying unit 130 to the specific power supply unit according to the control instructions from the control unit 190. In these figures, the PFC unit 160 is a power-saving circuit added to the power management unit to provide power efficiency.

In FIG. 3a, the power management mode is in stand-by mode. After the user selects using the command input unit 200 stand-by mode, the control unit 190 controls the switching unit 150 so that the DC power can be supplied to the power supply unit of the micro computer 140. More specifically, the switch to the micro computer power supply unit 140 is turned on or closed so that power can be supplied while the switches to the power supply unit of the signal processing unit 170 and the power supply unit of the display unit 180 are turned off or opened so that power cannot be supplied.

In FIG. 3b, the power management mode is active stand-by mode. In active stand-by mode, as in FIG. 3a, the DC power is supplied to the micro computer power supply unit 140. Furthermore, the DC power is also supplied to the power supply unit of the signal processing unit 170. Although power can be supplied via the PFC unit 160, if low amount of power (low power consumption) is supplied, the DC power can be supplied directly to the power supply unit without going through the PFC unit 160.

In FIG. 3c, the power management mode is normal mode. In normal mode, power is supplied to all power supply units, including the micro computer power supply unit 140, the power supply unit of the signal processing unit 170, and the power supply unit of the display unit 180. Different from FIGS. 3a and 3b, the DC power passes through the PFC unit 160 before being supplied to the power supply unit of the signal processing unit 170 and the power supply unit of the display unit 180.

Figure 4:
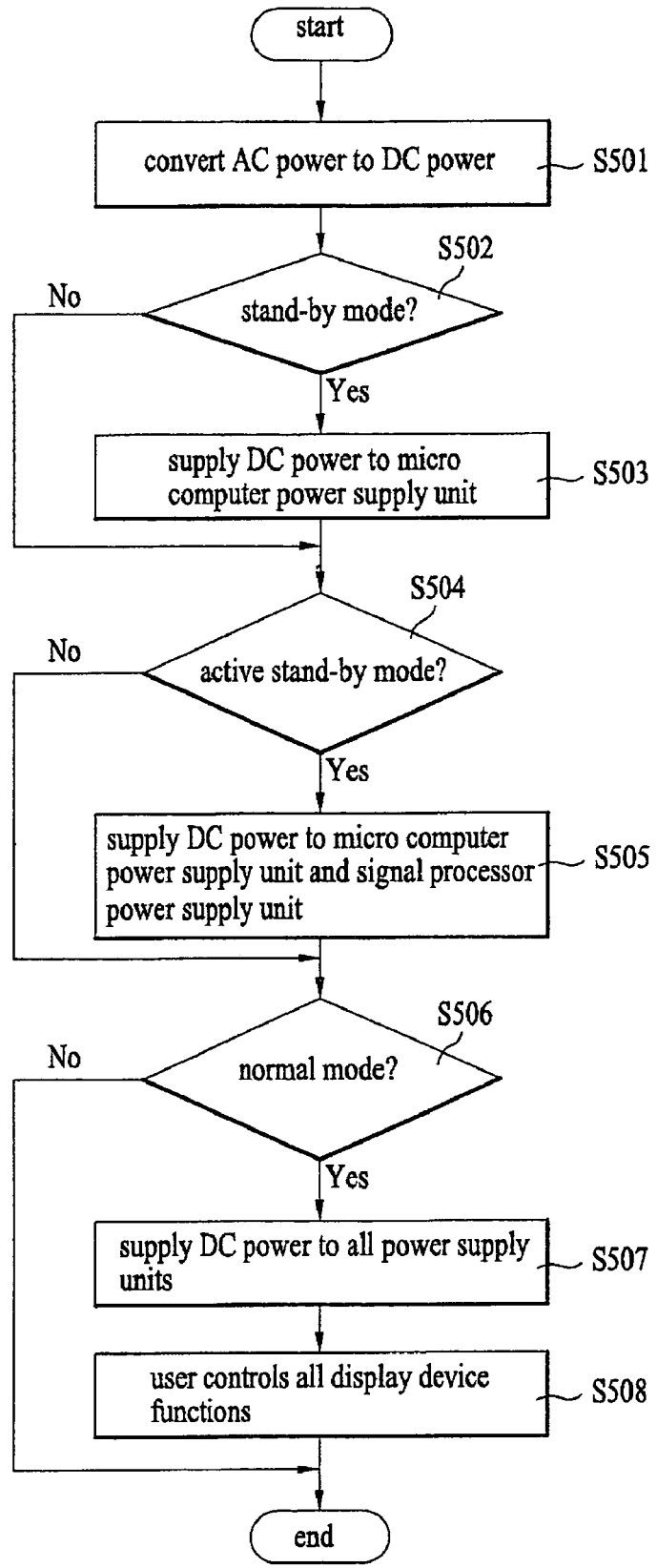
FIG. 4 is a flowchart illustrating the operation of the power management unit of the display device.

FIG. 4 is a flowchart illustrating the operation of the power management unit of the display device. In FIG. 4, after AC power is inputted, it is thereafter converted to DC power in the rectifying unit (S501). Next, the display device determines the status of the power management mode or which power management mode was selected by the user (S502). If the user has selected stand-by mode, DC power is provided only to the micro computer power supply unit (S503). If it is determined that the power management mode is not stand-by mode, further determination is made to check if the user has selected active stand-by mode (S504). If the selected power management mode is active stand-by mode, power is supplied to the power supply unit of the signal processing unit, without passing through the PFC unit, and to the micro computer power supply unit (S505). If, however, the user selected power management mode is neither stand-by mode nor active stand-by mode, then further determination is made to determine whether the user has selected normal mode (S506). If so, power is provided to all power supply units, including the micro computer power supply unit, the power supply unit of the signal processing unit, and the power supply unit of the display unit (S507). Furthermore, in normal mode, the user can control all the functions of the display device since power is supplied to all units (S508)

Figure 5:
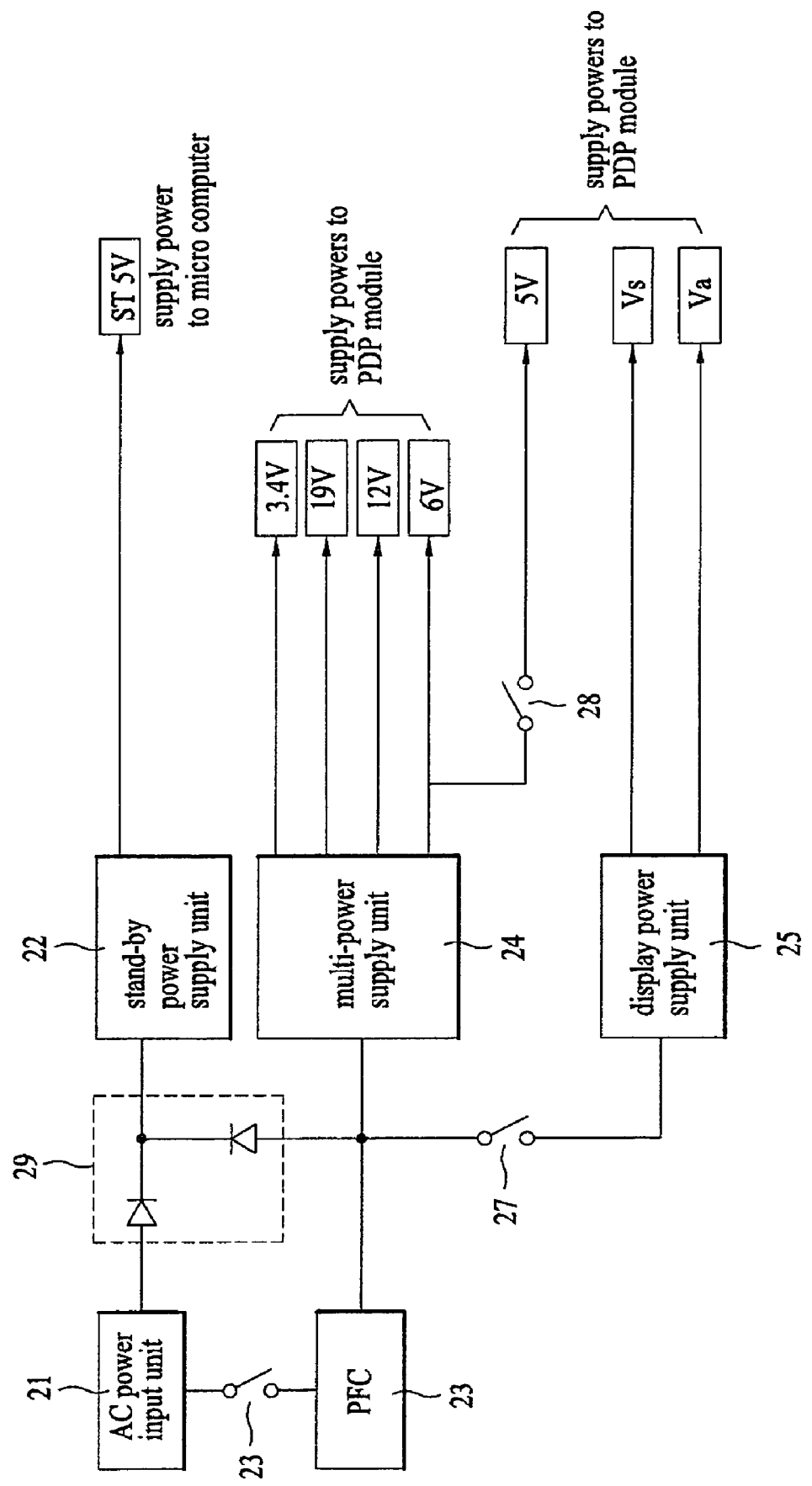
FIG. 5 is another block diagram illustrating power management units in a display device.

FIG. 5 is another block diagram illustrating power management units in a display device. In FIG. 5, the power management unit includes an AC power supply unit 21; a rectifying unit 29 for converting the AC power to DC power; a stand-by power supply unit 22 for supplying 5V to micro signal board using the DC power during stand-by mode; a PFC 23 for efficiently correcting power supplied during stand-by mode or normal mode; a multiple power supply unit 24 for supplying the DCR power (e.g., 3.4V, 19V, 12V, and 6V), a digital video recorder (DVR) power, and signal circuit power during stand-by mode, and supplying the display power (e.g., 5V) to the display module during active mode; a display power supply unit 25 for supplying display power (Vs and Va) to the display module; and a plurality of switches (i.e., SW1 26, SW2 27, SW3 28). Here, the SW1 26 is turned on or closed during stand-by mode and active mode while the SW2 27 and SW3 28 are only turned on or closed during active mode.

As discussed above, the conventional display device prevents the display power being supplied to the display module and maintains power supply to the signal board in order to use the DVR/DCR functions. This type of power management mode is referred to as active stand-by mode, and in order to sustain the active stand-by mode, the micro computer controls the multiple power supply unit within the power supply unit (PSU) and supplies power to the DCR, DVR, and circuit. In other words, in the conventional stand-by mode, supplying power to the display module was prevented while supplying power to the signal board was maintained in order to use the DCR/DVR features. Furthermore, the multi-power supply unit can be controlled (e.g., turned on/off); therefore, power for the DVR feature is not unnecessarily supplied even when the DVR feature is not utilized.

Provided below is an example of another embodiment of the present invention. Compared to the display device of the previous embodiment having three modes (stand-by, active stand-by, and normal), this embodiment presents further divides active stand-by mode into a first active stand-by mode and a second stand-by mode.

Here, the power management modes of the display device as explained above, including the first and second active stand-by modes, are not limited to the terms as explained here, but other terms or languages can be used to describe the same or similar functions of the power management modes of the display device.

As discussed above, the operation of the first and second active stand-by modes fall between stand-by mode and the normal mode. Stand-by mode is a mode which supplies minimum amount of power, enough to turn on power to the display device upon receiving a power on command from a remote control device, for example. In stand-by mode, power is provided only to the micro computer. On the other hand, normal mode is a mode in which power is supplied to all the power supply units of the display device. As for the first active stand-by mode, power is supplied to at least one power supply unit for operation of the micro computer and for operating the DCR feature. As for the second active stand-by mode, power is supplied to at least one power supply unit for the operation of the micro computer, for the operation of the DVR feature, and for the operation of the signal processing unit. In addition, power can be supplied to at least one display in the second active stand-by mode.

There is no limit to the number of active stand-by modes. For example, in the active stand-by mode, it is preferable to supply power to the micro computer and to the signal processor but not to the display module to the display device having the DCR/DVR features. The reason is that the display module requires high power consumption, the user may choose to use other features, such as recording, without using the display.

In case of a plasma display panel (PDP), for example, the power supply unit of the display module can be used as a power supply unit of the PDP. In case of a liquid crystal display (LCD), for example, the power supply unit of the display module can be used as an inverter power supply unit. Lastly, in case of a cathode ray tube (CRT), for example, the power supply unit of the display module can be used as a deflection unit.

Figure 6:
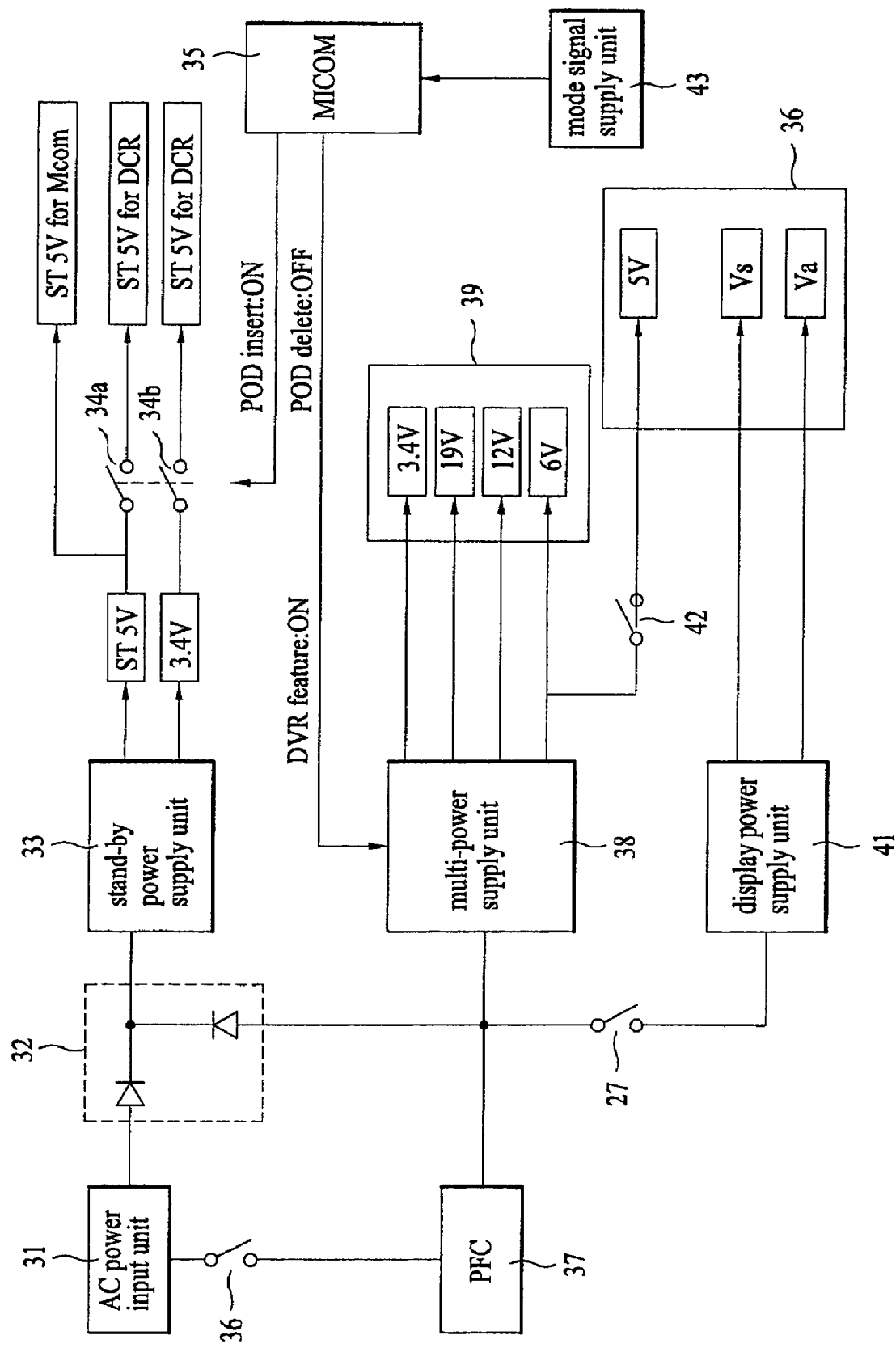
FIG. 6 is a block diagram illustrating a structure of a power management device of a display device according to the embodiment of the present invention.

FIG. 6 is a block diagram illustrating a structure of a power management device of a display device according to the embodiment of the present invention. In FIG. 6, the power supply units includes a signal processor circuit 39, a display unit 44 (hereinafter referred to as "PDP module"), a signal control supply unit 43, a signal board micro computer (or micro computer) 35, a stand-by power supply unit 33, and a multi-power supply unit 38. The mode signal supply unit 43 provides signal for DVR mode or DCR mode, and the signal board micro computer 35 provides control signals per selected mode after ceasing power supply to the PDP module 36 in response to the selected mode. Furthermore, in response to the control signal in DCR mode, the stand-by power supply unit 33 supplies power for operation of at least one DCR feature. Also, in response to the control signals in DVR mode, the multi-power supply unit 38 provides power for the signal processor circuit 39 and for operation of at least one DVR feature.

The power supply device of FIG. 6 further includes an AC power input unit 31, a rectifying unit 32, a power supply unit for the display unit 41, a PFC 37, a first switch (SW1) 36, a second switch (SW2) 40, and a first third switch (SW3-1) 34a, and a second third switch (SW3-2) 34b. In detail, the AC power input 31 receives AC power, while the rectifying unit 32 converts the received AC power to DC power. The display power supply unit 41 supplies power for display to the PDP module 44. The SW1 36 can connect or disconnect supplying of power supply between the AC power input 31 and the PFC 37. Moreover, the SW2 40 can disconnect supplying of power between the rectifying unit 32 and the display power unit 41 during DCR mode or DVR mode. Furthermore, in response to the control signal from the micro computer 35 instructing power to be supplied for the DCR feature, the SW3-1 34a and the SW3-2 34b can connect or disconnect power from being supplied for at least one DCR feature from the stand-by power supply unit 33.

The DCR mode control signal includes a signal for turning on the switch whose action corresponds to inserting of a Point of Deployment (POD) card, and a signal for turning off the switch whose action corresponds to taking out of the POD card. Here, power being supplied for the micro computer is 5V, power for operation of at least one DCR feature in DCR mode are 5V and 3.4V, and power for operation of at least one DVR feature in DVR mode and power for signal processing are 19V, 12V, and 6V.

Alternatively, in normal mode, the multi-power supply unit 38 supplies power (5V) to the PDP module 44 via a fourth switch (SW4) 42. As discussed above, the display device can be a television having DCR and/or DVR features and/or can be a PDP.

The AC input 31 receives AC power from an outside source. Thereafter, the rectifying unit 32 converts the inputted AC power to DC power. The signal processor 43 supplies mode signals necessary for managing power to the display device. In addition, the signal processor supplies the signals for whether the POD card in inserted or not, based on the selected DCR feature and/or mode signals corresponding to the selected DVR feature.

The micro computer 35 controls all four switches (SW1-SW4) based on the mode signals provided from the mode signal supply unit 43. Here, the mode signal supply unit 43 receives the mode selection input from the user, and based on the selected mode, the mode signal supply unit 43 supplies corresponding signals to the micro computer 35. That is, the micro computer 35 controls the power on/off of the SW1-SW4 to supply power to the units of the display device as instructed by the mode signals. Again, the mode signals correspond to the selected power management mode of the display device selected by the user.

The PFC 37 refers to a power-saving circuit provided between the AC input 31 and the power supply units, such as the stand-by power supply unit 33, the multi power supply unit 38, and the display power supply unit 41, in order to improve power efficiency.

The four switches, namely, SW1 36, SW2 40, SW3 34 (i.e., SW3-1 34a and SW3-2 34b), and SW4 42, are determined according to the mode signals provided from the mode signal supply unit 43 selected by a user. Here, as described above, the determined mode signal can by any one of the signal for stand-by mode, the first active stand-by mode, the second active stand-by mode, and normal mode. The mode signal supply unit 43 can be a remote control unit or buttons provided on the display device and also can be other sources.

The operations of the power management modes are as follows. If the power management mode is stand-by mode, the micro computer 35 opens the SW1-SW4, and the DC power for the micro computer 35 only is provided.

Next, the first active stand-by mode means that the user has selected the DCR feature. Here, the micro computer 35 turns on or closes the SW1 36, in turn allowing the stand-by power supply unit 33 to supply power to the micro computer 35 and for at least one DCR feature. However, the other three switches (i.e., SW2 40, SW3 34, and SW4 42) are turned off or opened so that power is not supplied for operating at least one DVR feature and the signal circuit. At the same time, power is not supplied to the PDP module 44 which requires high power consumption. Furthermore, in stand-by mode, a minimum amount of power is supplied; therefore, the AC power should not be supplied to the PFC 37. In other words, if the power being supplied is small, it is more efficient and preferable to directly supply power for operating the DCR instead of providing the power for operating the DCR feature through the PFC 37.

If the selected mode is the second active stand-by mode, it means that the user has selected the DVR feature. Here, the micro computer 35 turns on or closes the SW2 40 in order to allow the stand-by power supply unit 33 to supply power for the micro computer 35, and the multi power supply unit 38 to supply power to the signal processing unit 39 for providing power for at least one DVR feature and the signal circuit. As for the other three switches (i.e., SW1 34, SW3 4, and SW4 42), these switches are turned off or opened so as to prevent power from being supplied for the operation of at least one DCR feature and for the PDP module 44. In this mode, since relatively large amount of power is supplied, power can be supplied through the PFC 37, which passes through the closed SW2 40. Here, the signal processing unit can be a sound card, memory, and a hard disk drive (HDD), for example.

If the power supply device is in normal mode, the normal mode signal is provided via the mode signal supply unit 43. Here, the micro computer 35 turns on or closes all four switches (SW1-SW4) in order to close the path so that power can be supplied to all the power supply units. Here, power for at least one DCR feature can be supplied from the stand-by power supply unit. Moreover, the multi-power supply unit 38 supplies power to the signal circuit 39 so that power for operating at least one DVR feature and the signal circuit can be provided. Also, power for operating at least one display can be supplied to the PDP module 44. Since supplying power for display requires high power consumption, the power can be supplied to the PFC 37 via the SW1 36. Furthermore, in normal mode, power for operating feature and units are passed through the PFC 37 before being supplied to other units. Here, the multi-power supply unit 38, which supplies power to the signal processing unit 39, also can also supply power (i.e., 5V) to the PDP module 44 via the SW4 42.

Figure 7:
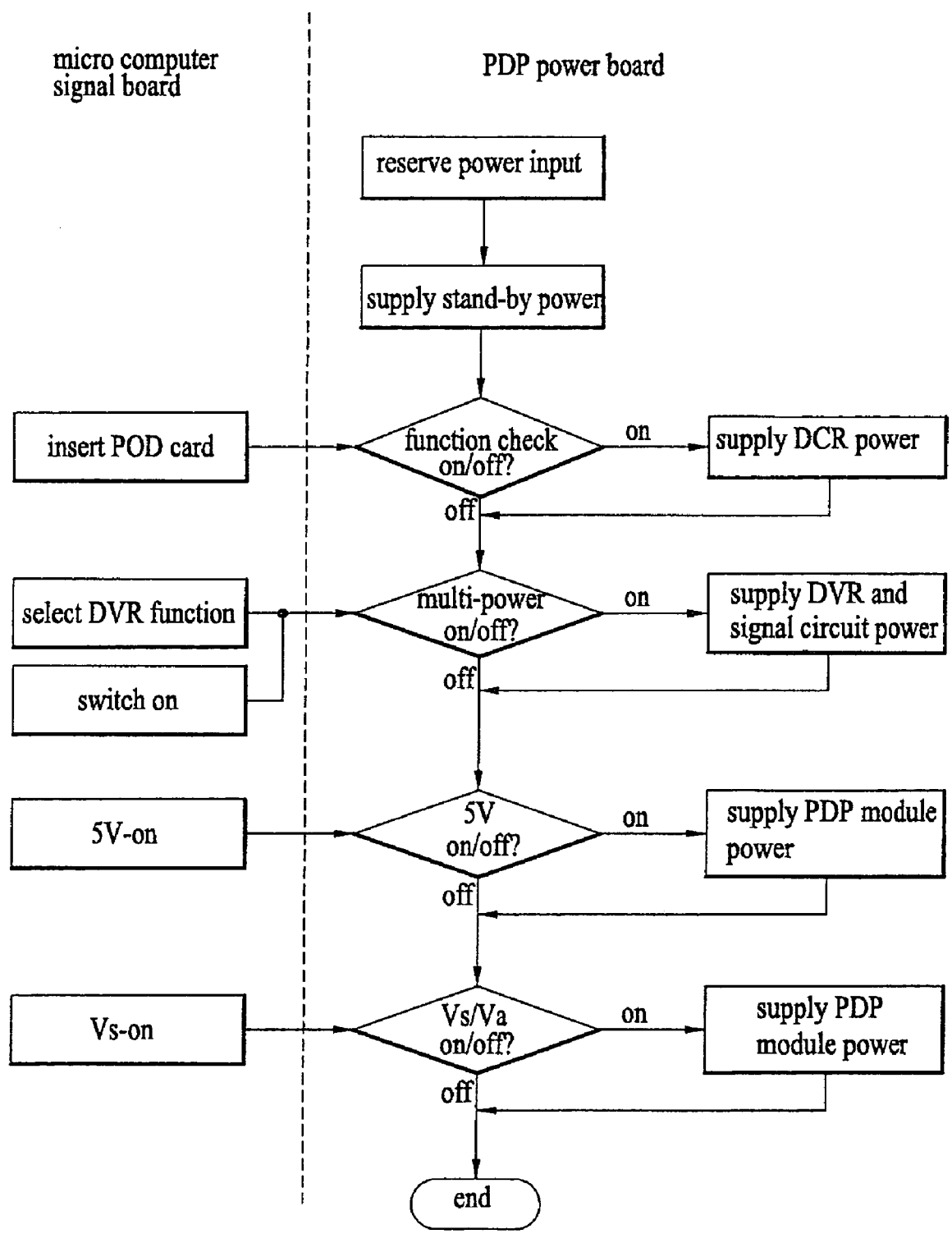
FIG. 7 is flowchart illustrating the operation of the power supply units of the display device.

Next, an operation of the power supply device will be explained according to the embodiment of the present invention with reference to FIG. 7. FIG. 7 is flowchart illustrating the operation of the power supply units of the display device. As illustrated in FIG. 7, the operation of the power supply device can be divided into two categories. The first category relates to the operation from the micro computer signal board 35, and the second category relates to the operation from the PDP power board.

An embodiment of the present invention relates to independently managing power for operating the DCR feature and the DVR feature. For example, in a display device having a micro computer, a signal processing circuit, and a display unit, corresponding signal for the DCR mode and/or the DVR mode can be selected by a user. According to the DCR/DVR mode signal, power supplied for operating display is cut off while providing power control signals corresponding to the mode. More specifically, by responding to the power control signal of the DCR mode, power for operating at least one DCR is supplied along with power for operating the micro computer. In respond to the power control signal of the DVR mode, power for operating at least one DVR is supplied along with power for operating at least one signal processing circuit.

To explain in detail, after the power to the display device turned on and the AC power is inputted, the rectifying unit 32 converts the AC power to the DC power. At this point, the display device is in stand-by mode and by default of being in stand-by mode, power (i.e., 5V) is supplied to the micro computer signal board 35. Thereafter, the micro computer 35 determines which mode the power management device is in with the aid of the mode signal supply unit 43.

If it is determined that the power management device is in the first active stand-by mode, or put differently, in a mode which supplies power for the operation of the DCR feature, the micro computer 35 turns on the switches, 34a and 34b, and instructs the stand-by power supply unit 33 to supply power (i.e., 5V and 3.3V) for the operation of the DCR feature. Preferably, in this mode, the micro computer 35 turns off or opens the switch 36 so that the stand-by power supply unit 33 can provide directly without passing through the PFC 37 power for the operation of the DCR feature.

Alternatively, if it is determined that the power management device is in the second active stand-by mode, or put differently, in a mode which supplies power for the operation of the DVR feature, the micro computer 35 turns off or opens the switches, 34a and 34b, so that the stand-by power supply unit 33 to cannot supply power for the operation of the DCR feature. Preferably, in this mode, the micro computer 35 turns on or closes the switch 36 so that the multi power supply unit 38 can provide power via the PFC 37 for the operation of the DVR feature (i.e., 19V, 12V, and 6V) and for the signal circuit. At the same time, the micro computer 35 turns off or opens the switches 40 and 42 so that power for the display (i.e., Vs and Va) cannot be supplied from the display power supply unit 41 to the display module which is also referred to as the PDP module 44.

Alternatively, if it is determined that the power management device is in normal mode, the micro computer 35 instructs all the power supply units, such as the stand-by power supply unit 33, the multi-power supply unit 38, and the display power supply unit 41, to supply DC power. In other words, the micro computer turns on or closes the switches 34a and 34b so that the stand-by power supply unit 33 can supply power (i.e., 5V) for operating the micro computer and power (i.e., 5V and 3.3V) for operating the DCR feature. Preferably, in this mode, the micro computer 35 turns on or closes the switch 36 so that the multi-power supply unit 38 can supply power via the PFC 37 for the operation of the DVR feature (i.e., 19V, 12V, and 6V) and for the signal circuit. At the same time, the micro computer 35 turns on or closes the switches 40 and 42 so that power for the display (i.e., Vs and Va) can be supplied from the display power supply unit 41 to the display module which is also referred to as the PDP module 44. Here, the multi-power supply unit 38 supplies 5V of display power to the PDP module 44. Because the display device is in normal mode, the user can operate all functions and features of the display device.

To summarize FIG. 7, when the power is turned on to the display device, by default, basic power (5V) is supplied to the micro computer 35. If the first active stand-by mode is selected, depending on whether the POD card is inserted to the micro computer signal board 35, power for operation of the DCR feature is supplied to the PDP power board. Alternatively, if the second active stand-by mode is selected, the switch 36 is turned on or closed to allow power for operation of at least one DVR feature and of the signal circuit to be supplied to the PDP power board. Here, power is supplied via the PFC 37. Alternatively, if normal mode is selected, the micro computer 35 turns on or closes the switches 40 and 42 so that power for the display (i.e., Vs, 5V, and Va) can be supplied from the display power supply unit 41 to the PDP module 44.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device for managing power supply in an active stand-by mode, the device comprising:
    a signal mode supply unit to provide control signals for a mode in which a digital cable ready (DCR) feature is selected or for a mode in which a digital video recorder (DVR) feature and a signal processing circuit are selected;
    a stand-by power supply unit for supplying power for operating a micro computer and for operating at least one DCR feature when the DCR feature is selected;
    a multi-power supply unit for supplying power for operating at least one DVR feature and for operating a signal processing circuit when the DVR feature is selected;
    a display power supply unit for supplying power for operating a display module; and
    a switch unit for directing power to be supplied to the multi-power supply unit or to the stand-by power unit, and not to the display power supply unit, in the active stand-by mode.

2. The device of claim 1, wherein when the DVR feature is selected, a switch for supplying power for operating at least one DVR feature and the signal processing circuit is turned on while other switches remain turned off.

3. The device of claim 1, wherein the stand-by power supply unit supplies 5V for operating the micro computer.

4. The device of claim 1, wherein the stand-by power supply unit supplies 5V and 3.4V for operating the at least one DCR feature.

5. The device of claim 1, wherein the multi-power supply unit supplies 3.4V, 19V, and 12V for operating the at least one DVR feature.

6. The device of claim 1, wherein the display device is a television that has the DCR feature and the DVR feature.

7. The device of claim 1, wherein the display device is a plasma display panel (PDP) device.

8. A method of managing power in a display device in an active stand-by mode, the method comprising:
    determining whether a digital cable ready (DCR) feature is selected;
    supplying power to a stand-by power supply unit for operating a micro computer and for operating at least one DCR feature when the DCR feature is selected;
    determining whether a digital video recorder (DVR) feature is selected; and
    supplying power to the stand-by power supply unit for operating the micro computer, and supplying power to a multi-power power supply unit for operating at least one DVR feature and for operating a signal processing circuit when the DVR feature is selected.

9. The method of claim 8, further comprising receiving control signals related to the operation of at least DCR feature, wherein the control signals control operation of at least one switch.

10. The device of claim 9, wherein when the DCR feature is selected, the at least one switch for supplying power for operating at least one DCR feature is turned on while other switches remain turned off.

11. The method of claim 9, wherein the at least one switch is turned on when a Point of Deployment (POD) card is detected in the display device.

12. The method of claim 9, wherein the at least one switch is turned off when a Point of Deployment (POD) card is not detected in the display device.

13. A method of managing power in a display device in active stand-by mode, the method comprising:
    determining whether a digital video recorder (DVR) feature is selected; and
    supplying power to a stand-by power supply unit for operating a micro computer, and supplying power to a multi-power power supply unit for operating at least one DVR feature and for operating a signal processing circuit when the DVR feature is selected.

14. The method of claim 13, further comprising receiving control signals related to the operation of at least DVR. feature and the operation of the signal processing circuit, wherein the control signals control operation of at least one switch.

15. The method of claim 13, further comprising:
    determining whether a digital cable ready (DCR) feature is selected; and
    supplying power to the stand-by power supply unit for operating the micro computer and for operating at least one DCR feature when the DCR feature is selected.

16. A display device for managing power supply in an active stand-by mode, the device comprising:
    an alternating current (AC) input unit for receiving an alternating current (AC) power;
    a rectifying unit for converting the alternating current (AC) power to a direct current (AC) power;
    a display power supply unit to supply power for operating a display module; and
    a switch unit for directing direct current (DC) power to be supplied to a multi-power supply unit for a signal processing circuit and to a stand-by power supply unit for a micro computer, and not to the display power supply unit, in the active stand-by mode.

17. The device of claim 16, further comprising:
    a signal mode supply unit to provide control signals for a mode in which a digital cable ready feature is selected or for a mode in which a digital video recorder feature and the signal processing circuit are selected, wherein the stand-by power supply unit supplies direct current (DC) power for operating the micro computer and for operating at least one digital cable ready feature when the digital cable ready feature is selected, and the multi-power supply unit supplies direct current (DC) power for operating at least one digital video recorder feature and for operating the signal processing circuit when the digital video recorder feature is selected.

18. The device of claim 17, wherein the control signals control operation of at least one switch.

19. The device of claim 18, wherein when the digital video recorder feature is selected, the at least one switch for supplying direct current (DC) power for operating the at least one digital video recorder feature and the signal processing circuit is turned on while other switches remain turned off.

20. The device of claim 17, wherein the stand-by power supply unit supplies 5V for operating the micro computer.

21. The device of claim 17, wherein the stand-by power supply unit supplies 5V and 3.4V for operating the at least one digital cable ready feature.

22. The device of claim 17, wherein the multi-power supply unit supplies 3.4V, 19V, and 12V for operating the at least one digital video recorder feature.

23. The device of claim 17, wherein the display device is a plasma display panel device.

\* \* \* \* \*